(12) United States Patent
Nagahama

(10) Patent No.: US 10,608,500 B2
(45) Date of Patent: Mar. 31, 2020

(54) ELECTRIC POWER TOOL

(71) Applicant: MAKITA CORPORATION, Anjo-shi, Aichi (JP)

(72) Inventor: Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 464 days.

(21) Appl. No.: 15/392,747

(22) Filed: Dec. 28, 2016

(65) Prior Publication Data
US 2017/0214292 A1    Jul. 27, 2017

(30) Foreign Application Priority Data
Jan. 26, 2016   (JP) ................................ 2016-012683

(51) Int. Cl.
*H02K 7/14*    (2006.01)
*H02K 3/52*    (2006.01)
(Continued)

(52) U.S. Cl.
CPC ............... *H02K 7/145* (2013.01); *B25F 5/00* (2013.01); *H01M 2/0202* (2013.01); *H01M 2/30* (2013.01);
(Continued)

(58) Field of Classification Search
CPC ...... H02K 7/145; H02K 11/215; H02K 11/21; H02K 1/12; H02K 3/522; H02K 5/225;
(Continued)

(56) References Cited

U.S. PATENT DOCUMENTS

2005/0179329 A1* 8/2005 Okazaki ............... B62D 5/0403
                                                      310/71
2007/0296292 A1* 12/2007 Kienzler ................ H02K 3/522
                                                      310/71
(Continued)

FOREIGN PATENT DOCUMENTS

EP          2849316 A2     3/2015
JP       2005-229721 A     8/2005
(Continued)

OTHER PUBLICATIONS

Jun. 21, 2017 Extended Search Report issued in European Patent Application No. 17153004.1.
(Continued)

*Primary Examiner* — Jue Zhang
(74) *Attorney, Agent, or Firm* — Oliff PLC

(57) ABSTRACT

In an impact driver, a stator is made compact to accommodate a brushless motor in a reduced space, thereby keeping a housing compact, and productivity and handleability are also improved. The impact driver includes a brushless motor including a stator in which coils are wound and that includes fusing terminals at which the coils are fused, and a rotor capable of rotating relative to the stator, lead wires for supplying power to the coils, respectively, and lead wire-side terminals to which the lead wires are connected, respectively. The fusing terminals and the lead wire-side terminals are connected to each other at a predetermined position (a connection plate) in a circumferential direction of the stator by means of screws.

10 Claims, 15 Drawing Sheets

(51) Int. Cl.
*H02K 11/215* (2016.01)
*H02P 6/17* (2016.01)
*B25F 5/00* (2006.01)
*H01M 2/02* (2006.01)
*H01M 2/30* (2006.01)
*H01M 10/42* (2006.01)
*H01M 10/48* (2006.01)
*H02K 1/12* (2006.01)
*H02K 5/22* (2006.01)
*H02K 9/06* (2006.01)
*H02K 11/21* (2016.01)

(52) U.S. Cl.
CPC ....... *H01M 10/425* (2013.01); *H01M 10/488* (2013.01); *H02K 1/12* (2013.01); *H02K 3/522* (2013.01); *H02K 5/225* (2013.01); *H02K 9/06* (2013.01); *H02K 11/215* (2016.01); *H02P 6/17* (2016.02); *H01M 2220/30* (2013.01); *H02K 11/21* (2016.01)

(58) Field of Classification Search
CPC ... H02K 9/06; H02P 6/17; B25F 5/00; H01M 2/0202; H01M 2/30; H01M 10/425; H01M 10/488; H01M 2220/30
See application file for complete search history.

(56) References Cited

U.S. PATENT DOCUMENTS

| | | | |
|---|---|---|---|
| 2010/0033044 A1* | 2/2010 | Isshiki | B62D 5/0403 310/71 |
| 2010/0187924 A1* | 7/2010 | Yagai | H02K 3/522 310/71 |
| 2010/0259119 A1 | 10/2010 | Wang | |
| 2010/0320853 A1* | 12/2010 | Isogai | H02K 5/225 310/71 |
| 2013/0207491 A1* | 8/2013 | Hatfield | H02K 3/522 310/50 |

FOREIGN PATENT DOCUMENTS

| | | |
|---|---|---|
| JP | 2008-24171 A | 2/2008 |
| JP | 2008-054391 A | 3/2008 |
| JP | 2015-56953 A | 3/2015 |

OTHER PUBLICATIONS

Jun. 21, 2019 Office Action issued in Japanese Patent Application No. 2016-012683.

* cited by examiner

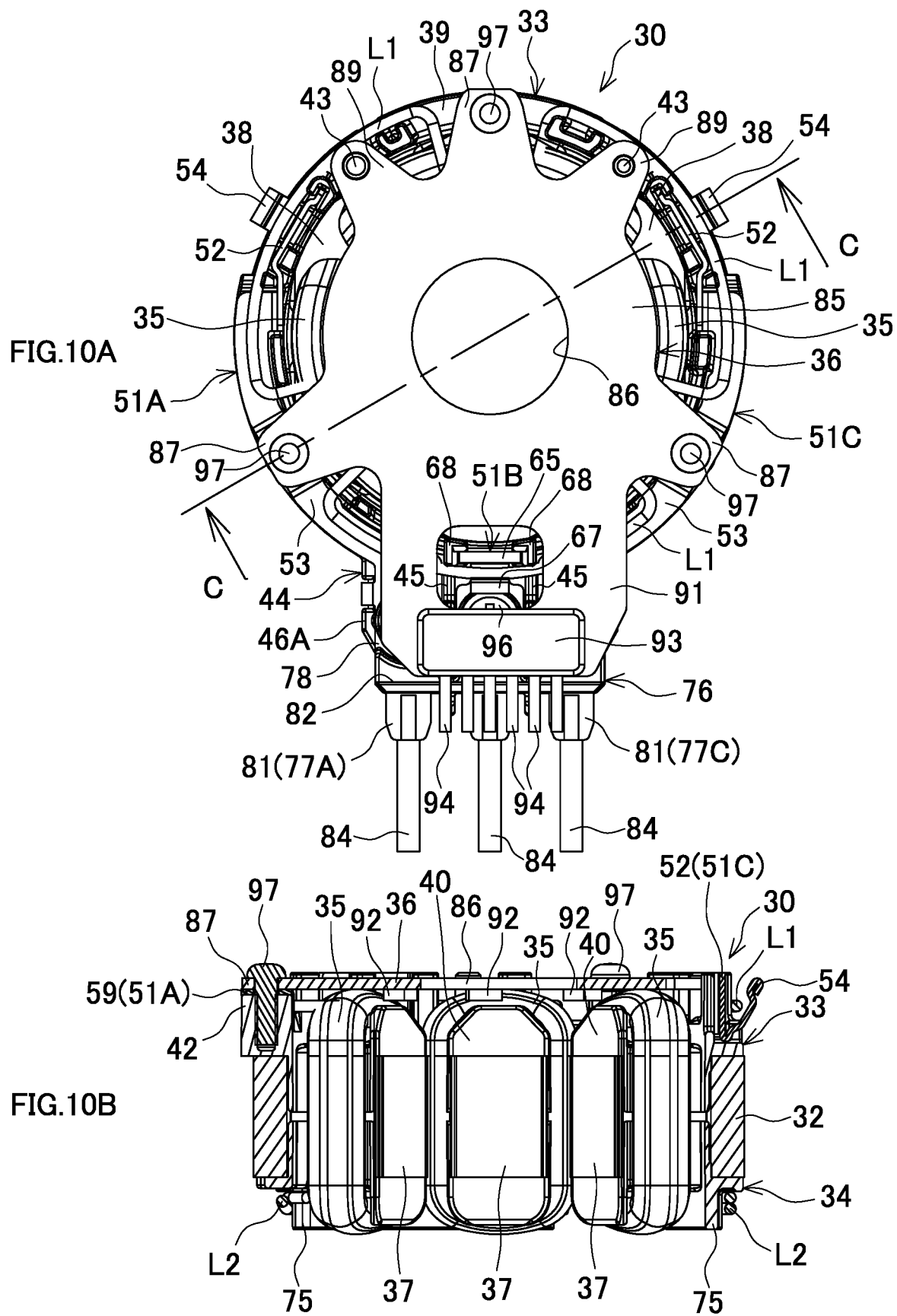

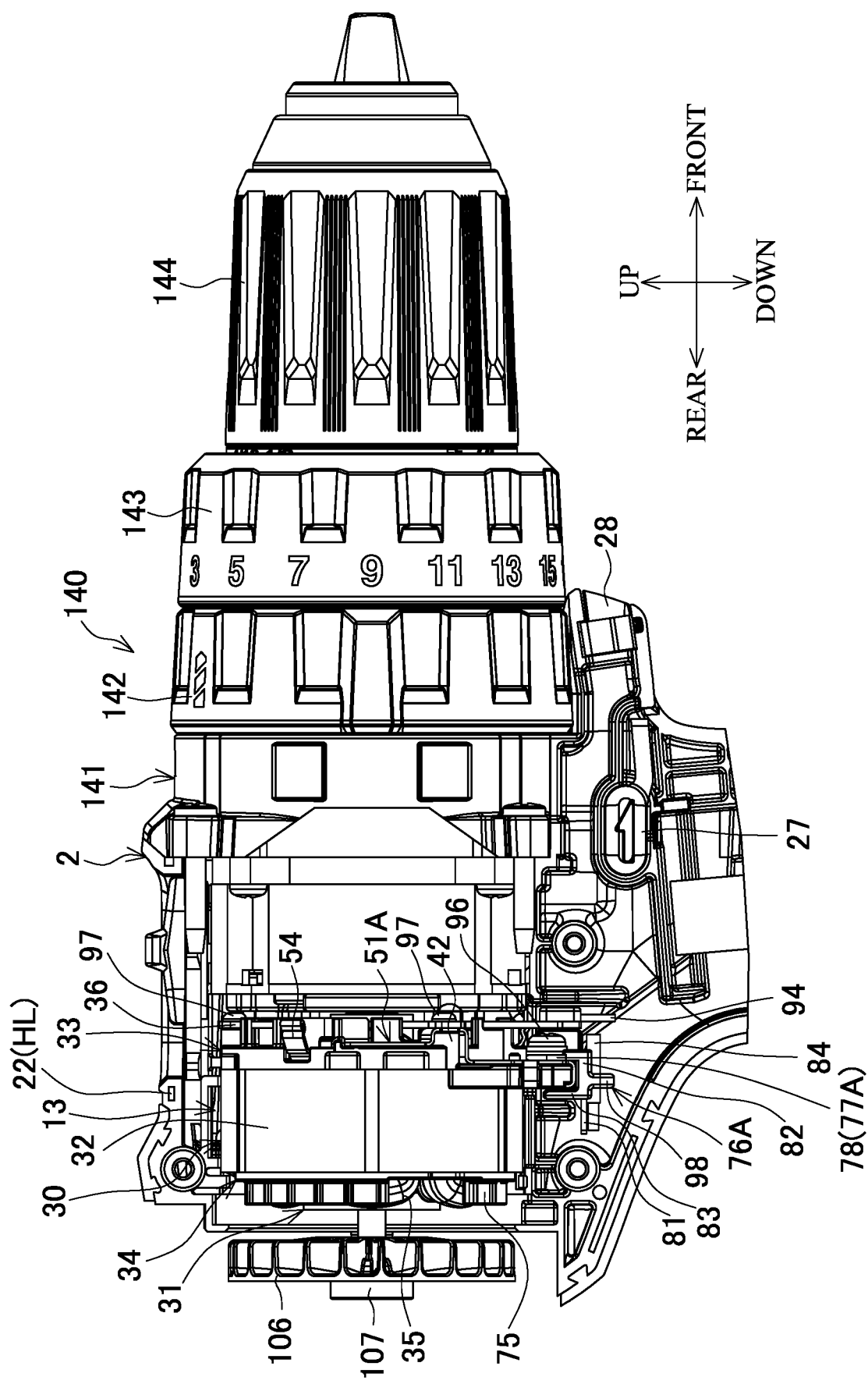

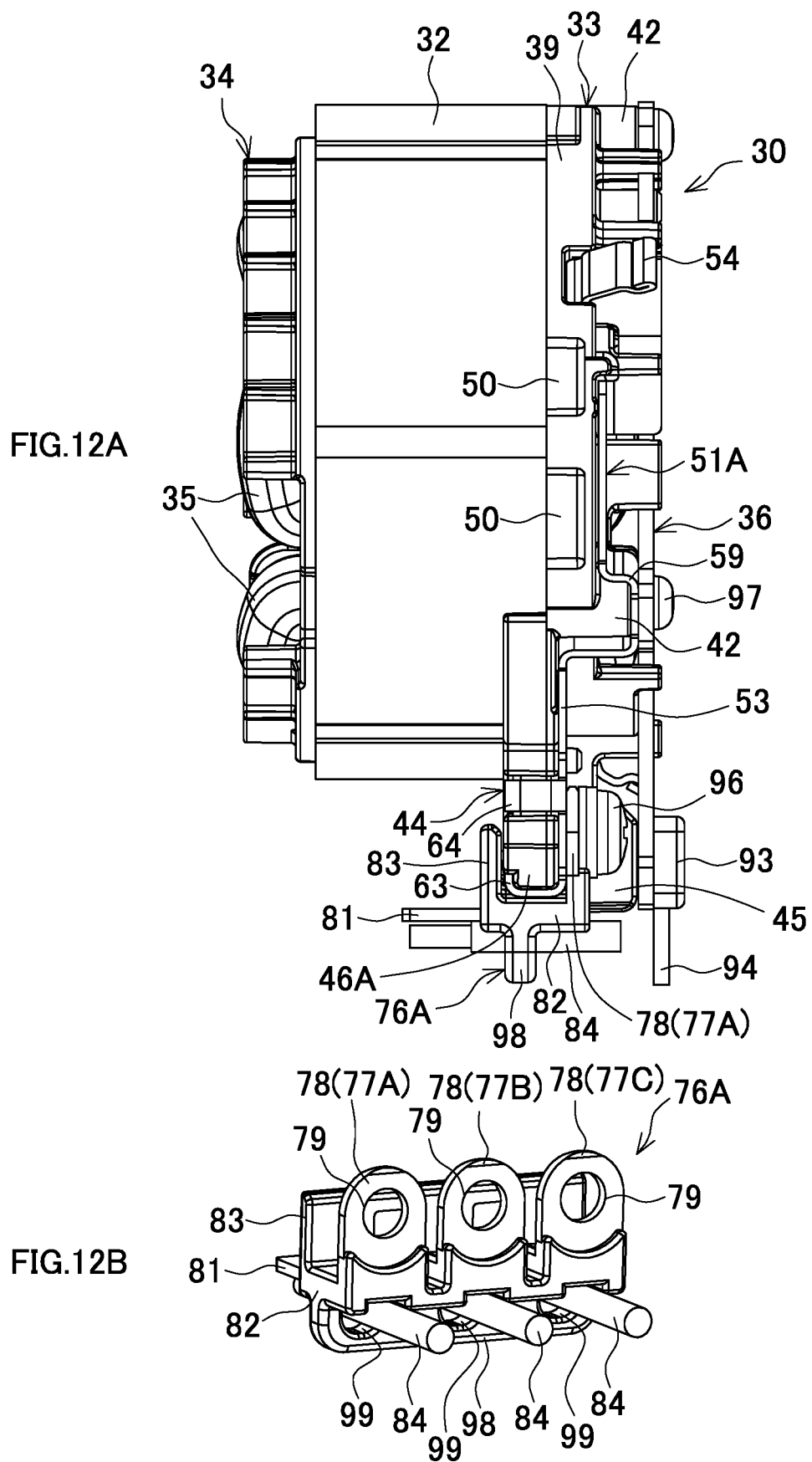

ELECTRIC POWER TOOL

BACKGROUND OF THE INVENTION

This application claims the benefit of Japanese Patent Application Number 2016-012683 filed on Jan. 26, 2016, the entirety of which is incorporated by reference.

FIELD OF THE INVENTION

The present invention relates to an electric power tool in which a brushless motor is used as a drive source.

DESCRIPTION OF THE BACKGROUND ART

An electric power tool, such as an impact driver, in which a brushless motor is used as a drive source has been known. As disclosed in Japanese Laid-Open Patent Publication No. 2008-54391, the brushless motor includes a stator in which a plurality of coils are wound via an insulator (insulating member) made of a resin, and a rotor including a rotation shaft. A sensor circuit board, on which a rotation detection element for detecting the positions of permanent magnets provided to the rotor and outputting rotation detection signals is mounted, is fixed to the stator.

In such a brushless motor, the ends of the coils and lead wires through which power is supplied are connected to each other by means of soldering using a plurality of fusing terminals (three fusing terminals in the case of a three-phase delta connection) provided to the insulator, or the like. Thus, the end processed portions become large in the radial direction to impair compactness, leading to an increase in the size of a housing of the electric power tool. In addition, it is necessary to perform soldering of the ends of the coils and the lead wires, etc., during production of the stator. Thus, in assembling the stator to the housing, the lead wires may be obstacles to decrease the productivity, and in repairing or the like of the stator, work occurs to remove a controller connected to the stator via the lead wires, together with the stator, so that handling of the stator becomes cumbersome.

Therefore, an object of the present invention is to provide an electric power tool in which a stator is made compact to accommodate a brushless motor in a reduced space, thereby enabling a housing to be kept compact, and that can improve productivity and handleability.

SUMMARY OF THE INVENTION

In order to attain the above-mentioned object, one aspect of the present invention is directed to an electric power tool that may include a brushless motor including a stator in which a coil is wound and that includes a coil-side terminal to which the coil is connected, and a rotor capable of rotating relative to the stator, a lead wire for supplying power to the coil, and a lead wire-side terminal to which the lead wire is connected. In the electric power tool, the coil-side terminal and the lead wire-side terminal may be connected to each other at a predetermined position in a circumferential direction of the stator by means of a screw.

According to another aspect of the present invention, the lead wire-side terminal may be enabled to be provisionally fixed to the coil-side terminal at a connection position by means of the screw.

In order to attain the above-mentioned object, another aspect of the present invention is directed to an electric power tool that may include a brushless motor including a stator in which a coil is wound and that includes a fusing terminal at which the coil is fused, and a rotor capable of rotating relative to the stator, a lead wire for supplying power to the coil, and a lead wire-side terminal to which the lead wire is connected. In the electric power tool, the fusing terminal may extend along a circumferential direction of the stator and may be connected to the lead wire-side terminal at a predetermined position in the circumferential direction of the stator.

According to another aspect of the present invention, a sensor circuit board for detecting a rotation position of the rotor may be screw-fastened to an end portion of the stator, and the fusing terminal may be fixed together with the sensor circuit board by means of a screw for fixing the sensor circuit board.

According to another aspect of the present invention, an escape portion for avoiding interference with the fusing terminal may be formed in the sensor circuit board.

In order to attain the above-mentioned object, another aspect of the present invention is directed to an electric power tool that may include a brushless motor including a stator in which a plurality of coils are wound, and a rotor capable of rotating relative to the stator, and a plurality of lead wires for supplying power to the plurality of coils, respectively. In the electric power tool, the plurality of lead wires may be unitized into a unit and connected to the plurality of coils, respectively, at a predetermined position in a circumferential direction of the stator.

In order to attain the above-mentioned object, another aspect of the present invention is directed to an electric power tool set that may include a first electric power tool and a second electric power tool.

The first electric power tool may include a first brushless motor including a first stator in which a first coil is wound and that includes a first coil-side terminal to which the first coil is connected, and a first rotor capable of rotating relative to the first stator, a first lead wire for supplying power to the first coil, and a first lead wire-side terminal to which the first lead wire is connected. The first coil-side terminal and the first lead wire-side terminal may be connected to each other at a predetermined position in a circumferential direction of the first stator by means of a screw.

The second electric power tool may include a second brushless motor including a second stator in which a second coil is wound and that includes a second coil-side terminal to which the second coil is connected, and a second rotor capable of rotating relative to the second stator, a second lead wire for supplying power to the second coil, and a second lead wire-side terminal to which the second lead wire is connected. The second coil-side terminal and the second lead wire-side terminal may be connected to each other at a predetermined position in a circumferential direction of the second stator by means of a screw.

In the electric power tool set, a direction in which the first lead wire is extended and a direction in which the second lead wire is extended may be different from each other.

According to the present invention, since an end processed portion of the brushless motor is one location on the stator, the size of the stator does not increase in the radial direction, and also wiring is achieved collectively at the one location by using a dead space. Thus, the brushless motor can be accommodated in a reduced space, so that a housing can be kept compact. Moreover, an end processing operation can be performed collectively at the predetermined position on the stator, so that the productivity and the handleability also improve.

BRIEF DESCRIPTION OF THE DRAWINGS

FIG. 10A is a front view of the stator.

FIG. 10B is a cross-sectional view taken along a line C-C in FIG. 10A.

FIG. 11 is a side view of a main body of a driver drill in a state where a rear cover and a right half housing are removed.

FIG. 12A is a side view of a stator.

FIG. 12B is a perspective view of a terminal unit.

DESCRIPTION OF THE PREFERRED EMBODIMENTS

Hereinafter, an embodiment of the present invention will be described with reference to the drawings.

Figure 1:
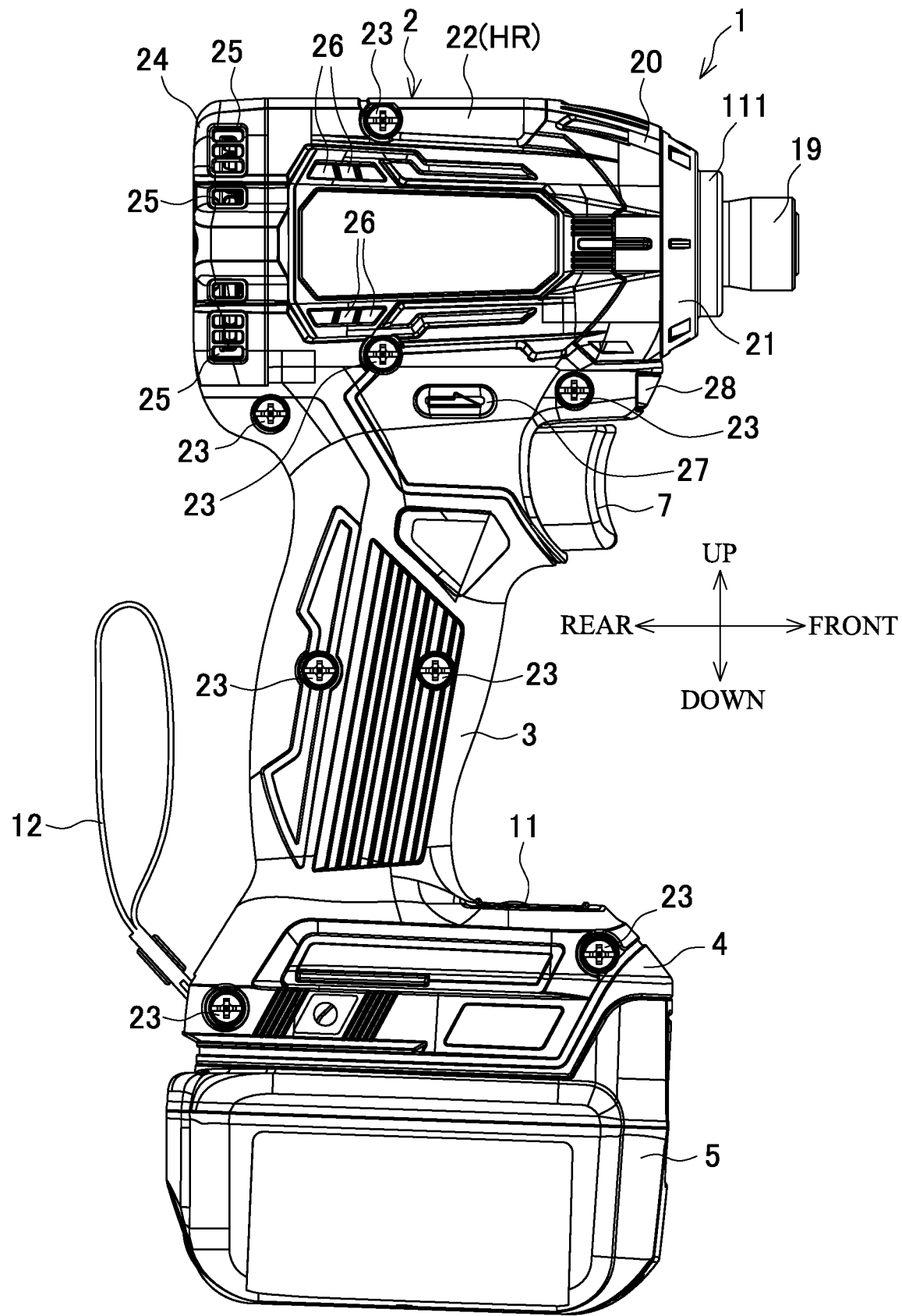
FIG. 1 is a side view of an impact driver.
Figure 2:
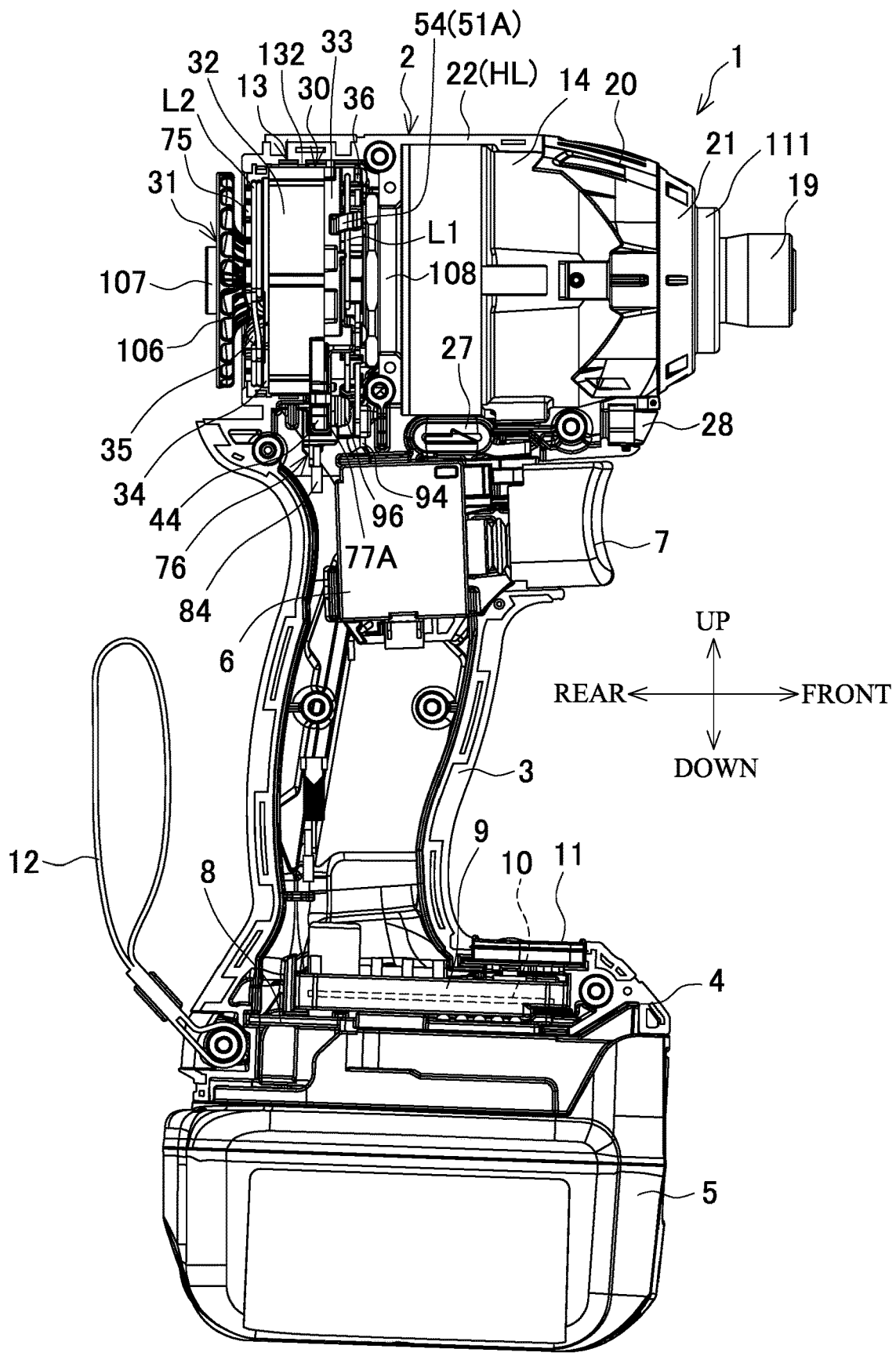
FIG. 2 is a side view in a state where a rear cover and a right half housing are removed.
Figure 3:
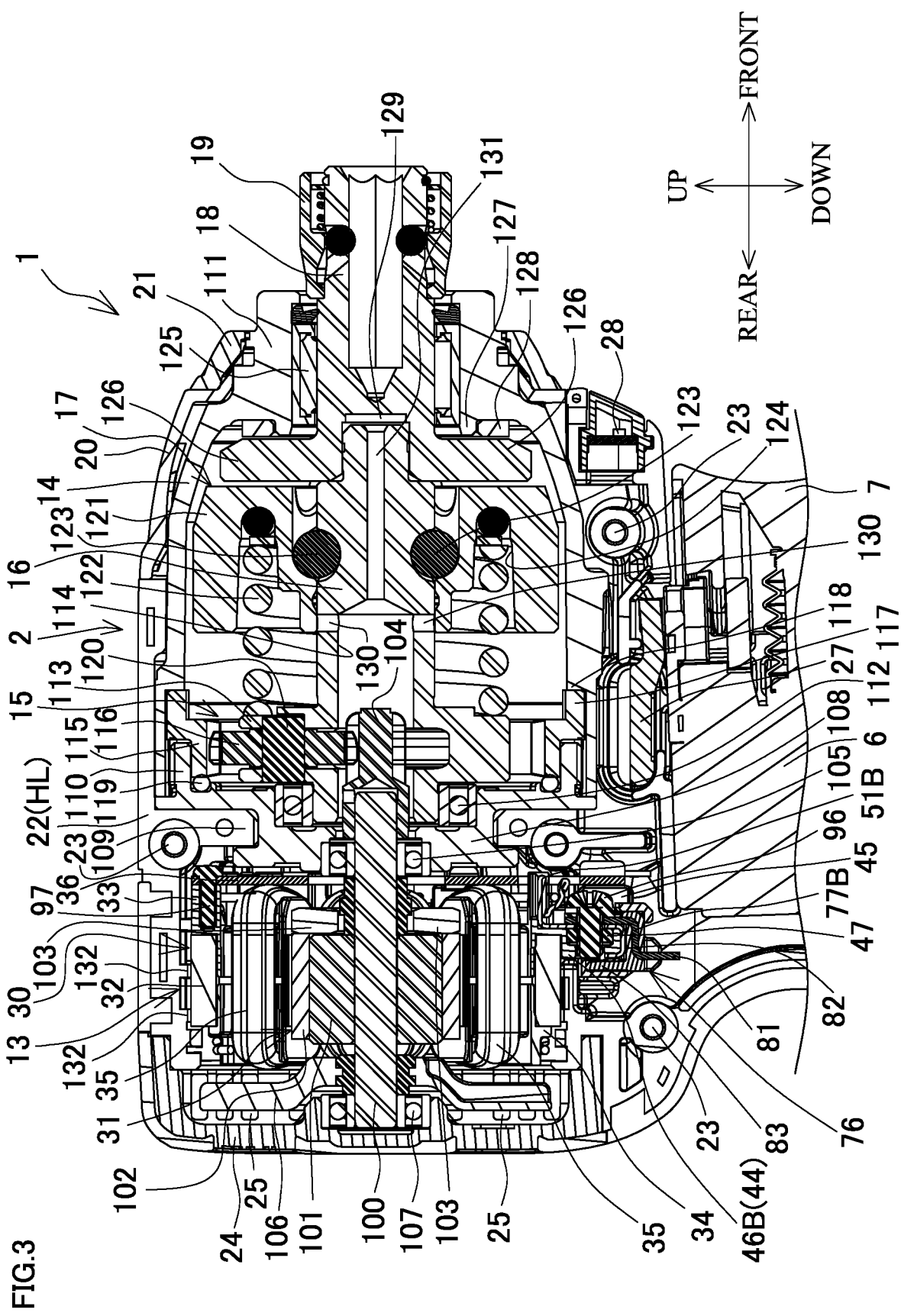
FIG. 3 is an enlarged longitudinal cross-sectional view of a main body.

FIG. 1 is a side view of an impact driver that is an example of an electric power tool, FIG. 2 is a side view in a state where a rear cover and a right half housing are removed, and FIG. 3 is an enlarged longitudinal cross-sectional view of a main body.

The impact driver 1 includes a main body 2 having a central axis extending in a front-rear direction and a grip portion 3 projecting downward from the main body 2. A battery pack 5 that is a power source is mounted on a battery mount portion 4 provided at the lower end of the grip portion 3. A switch 6 from which a trigger 7 projects frontward is accommodated in an upper portion of the grip portion 3. A terminal block 8 and a controller 9 are provided in the battery mount portion 4. The terminal block 8 is electrically connected to the battery pack 5 and the controller 9 includes a control circuit board 10 on which a microcomputer and the like are mounted. In addition, a switch panel 11 is provided in the battery mount portion 4. The switch panel 11 includes a push button to be operated for changing a rotation rate and a display portion for displaying a remaining capacity of the battery. Reference numeral 12 denotes a strap.

In the main body 2, a brushless motor 13 and a hammer case 14 are accommodated in order from the rear. Within the hammer case 14, a planetary gear speed reducing mechanism 15 that reduces the speed of rotation of a rotation shaft 100 of the brushless motor 13, a spindle 16 that is rotated at a reduced speed by the planetary gear speed reducing mechanism 15, a hammering mechanism 17 that adds a hammering motion to rotation of the spindle 16, and an anvil 18 that is a final output shaft are provided. The anvil 18 projects frontward from the front end of the main body 2. A sleeve 19 for attaching and detaching a bit is provided at the distal end of the anvil 18, and a cover 20 made of a resin and a bumper 21 made of rubber are provided externally on a front portion of the hammer case 14 in rear of the sleeve 19.

A rear-half portion of the main body 2 includes a tubular motor housing 22 that accommodates the brushless motor 13 therein and is integrated with the grip portion 3. The motor housing 22 and the grip portion 3 are formed by assembling a pair of right and left half housings HR and HL by means of a plurality of screws 23, 23 . . . . The rear end of the motor housing 22 is closed by a cap-shaped rear cover 24 having exhaust ports 25 in side surfaces thereof. Suction ports 26, 26 . . . are formed in side surfaces of the motor housing 22 and in front of the rear cover 24. Reference numeral 27 denotes a motor forward and reverse switching lever provided between the switch 6 and the hammer case 14, and reference numeral 28 denotes an LED that is provided in front of the motor forward and reverse switching lever 27 and irradiates the area in front of the anvil 18.

Figure 4:
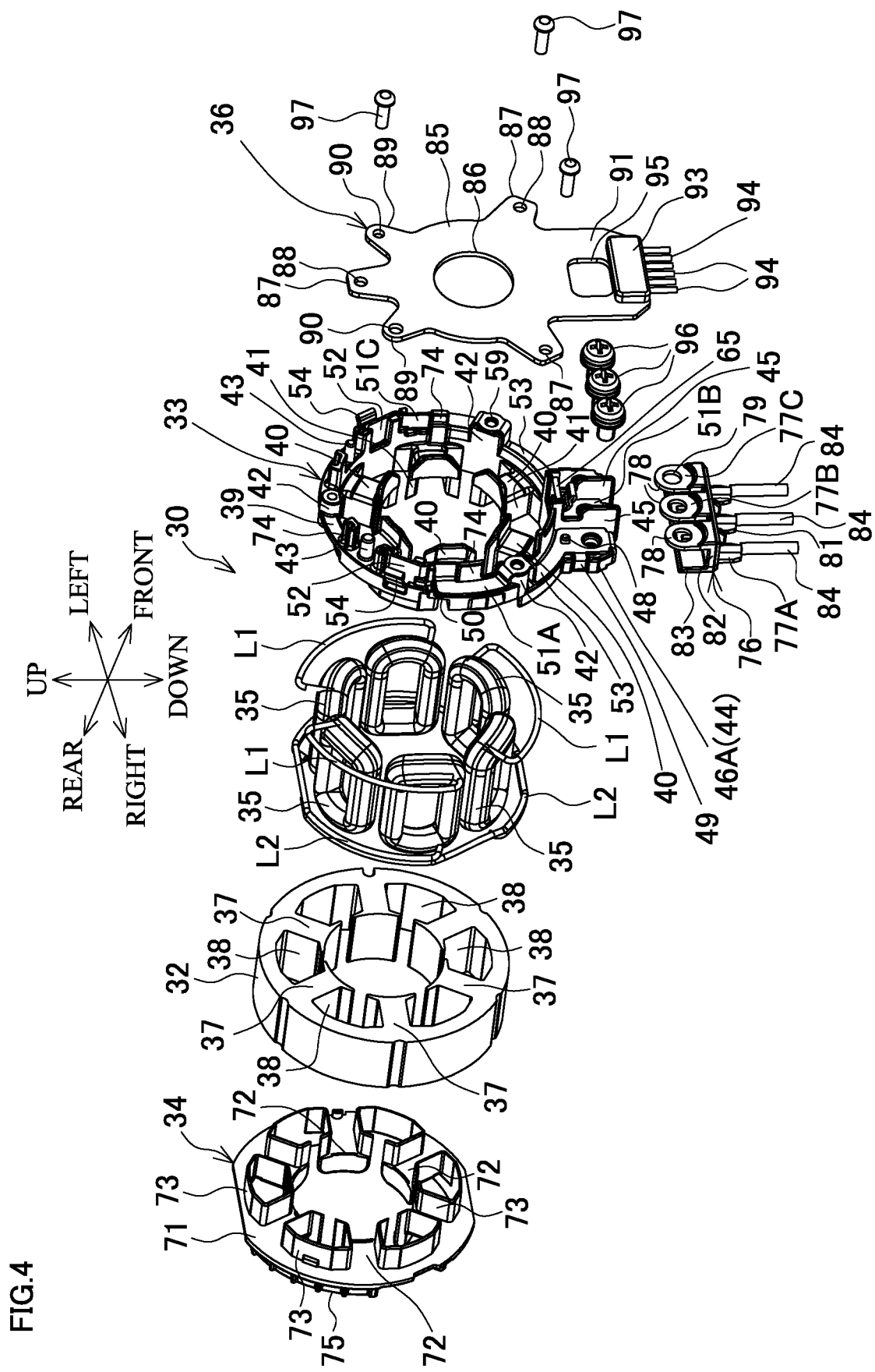
FIG. 4 is an exploded perspective view of a stator.

The brushless motor 13 is of an inner rotor type including a stator 30 and a rotor 31. First, as shown also in FIG. 4, the stator 30 includes a stator core 32, a front insulating member 33 and a rear insulating member 34 provided in front of and in rear of the stator core 32, respectively, a plurality of coils 35, 35 . . . (here, one pair of coils 35 for each of U-phase, V-phase, and W-phase, six coils 35 in total) wound on the stator core 32 via the front insulating member 33 and the rear insulating member 34, and a sensor circuit board 36 attached to the front insulating member 33.

The stator core 32 is formed by stacking a plurality of steel plates, and six T-shaped teeth 37, 37 . . . are provided on the inner periphery of the stator core 32 at equal intervals so as to project toward the axis side, to form six slots 38, 38 between the respective teeth 37, 37.

The front insulating member 33 includes a ring portion 39 and six insulating ribs 40, 40 . . . . The ring portion 39 has an outer diameter substantially equal to that of the stator core 32 and is made of a resin. The insulating ribs 40, 40 . . . are formed at the inner peripheral side of the ring portion 39 so as to extend in the radial direction and are located in front of the respective teeth 37, and each have a T shape in a front view. Six fitting ribs 41, 41 . . . fitted to the respective slots 38 are formed on the back surface of the front insulating member 33 over the inner edges of the insulating ribs 40, 40 adjacent to each other in the circumferential direction and over the inner edge of the ring portion 39.

Figure 5:
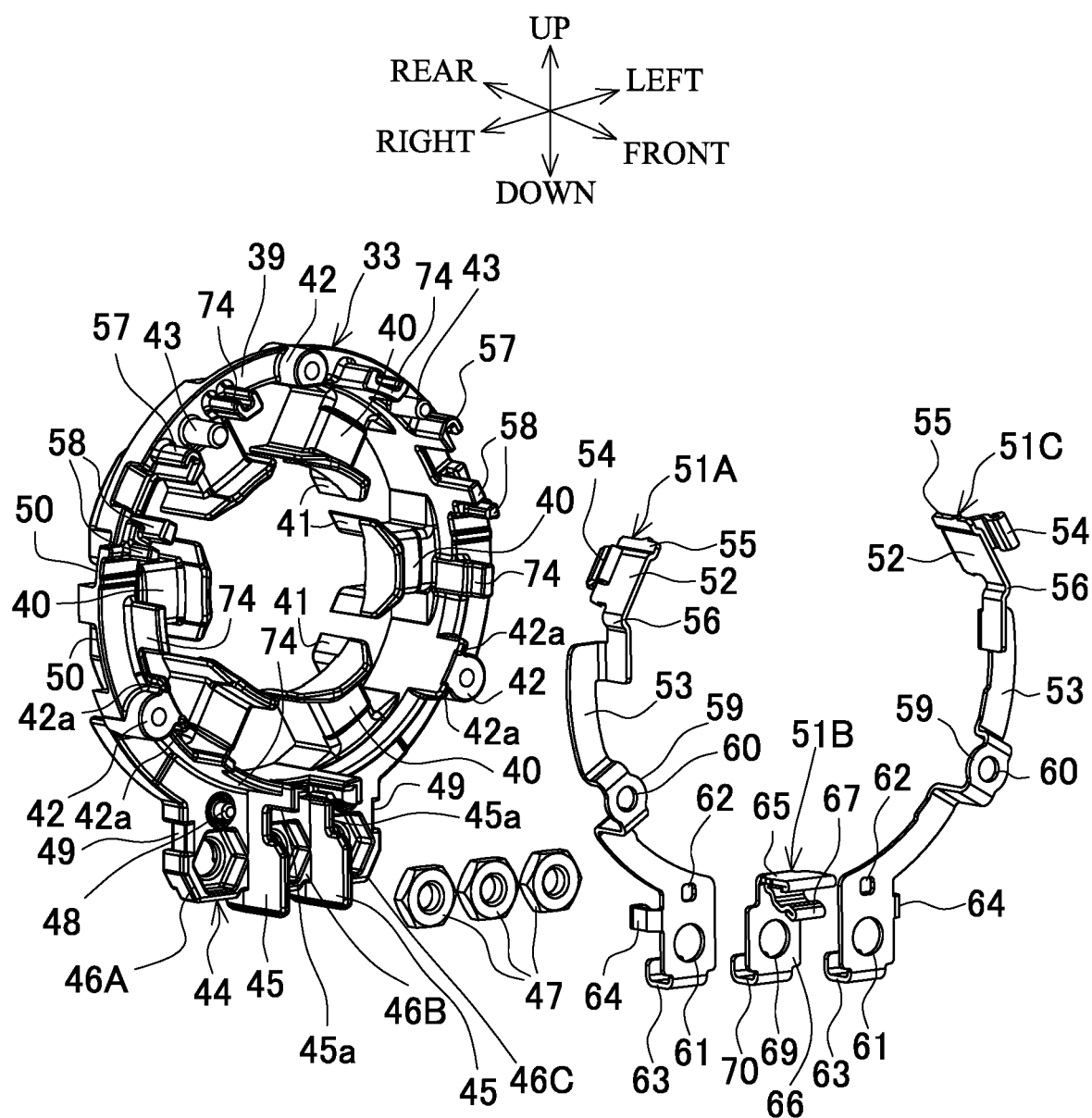
FIG. 5 is an exploded perspective view of a front insulating member.

As shown also in FIG. 5, three screw bosses 42, 42 . . . for screw-fastening the sensor circuit board 36 are provided so as to project on the front surface of the ring portion 39 at equal intervals in the circumferential direction such that the screw bosses 42 are located at the apexes of a regular triangle. Positioning pins 43, 43 for positioning the sensor circuit board 36 are provided so as to project at both sides of the screw boss 42 located at the upper side. A connection plate 44 is provided at a lower portion of the ring portion 39 so as to project downward toward the radially outer side. A pair of partition ribs 45, 45 that partition the connection plate 44 into three connection pieces 46A, 46B, and 46C in the right-left direction are provided upright on the front surface of the connection plate 44 so as to extend in the up-down direction. In each of the connection pieces 46A to 46C, a through hole is formed so as to extend in the front-rear direction, and a nut 47 is buried at the front side of the through hole. On each of the connection pieces 46A and 46C at the left and right sides, a positioning projection 48 is provided so as to project at the upper side of the nut 47. On each of the right and left side surfaces of the connection pieces 46A and 46C at both sides, a groove 49 is formed so as to extend in the front-rear direction. On the right and left side surfaces of the ring portion 39, recesses 50, 50 for positioning in the motor housing 22 are formed.

Furthermore, three fusing terminals 51A, 51B, and 51C that are coil-side terminals for connecting lead wires as power lines to the coils 35 of the respective phases are provided to the ring portion 39. Each of the fusing terminals 51A and 51C includes a fusing portion 52 and an extension portion 53. The fusing portion 52 fuses the lead wire. The extension portion 53 extends from the fusing portion 52 along the ring portion 39 in a circular arc shape and distal end side of the extension portion 53 bends outward and is located in front of the connection piece 46A or 46C. The fusing portion 52 is formed in an upright attitude on the front surface of the ring portion 39, a clamping piece 54 is formed at the outer side of the fusing portion 52 so as to fold back frontward from the rear end of the fusing portion 52, and support pieces 55 and 56 are formed at both sides of the fusing portion 52 in the circumferential direction. On the ring portion 39, a holding projection 57 and two inner and outer clamping projections 58 are provided upright. The holding projection 57 supports the support piece 55 of each fusing portion 52 and has a substantially U shape in a front view, and the two inner and outer clamping projections 58 hold therebetween the support piece 56 of each fusing portion 52 at the opposite side.

Each extension portion 53 is provided contiguously from the support piece 56 at a right angle and formed in a lateral attitude and parallel to the front surface of the ring portion 39. At the position of the screw boss 42, a projection portion 59 is formed so as to extend beyond the front surface of the screw boss 42. Reference numeral 60 denotes a through hole provided in the projection portion 59.

A through hole 61 corresponding to the nut 47 and a square hole 62 corresponding to the positioning projection 48 are formed in a distal end portion of each extension portion 53 which is located in front of the connection piece 46A or 46C. A lower tab 63 is formed on the distal end portion of each extension portion 53 and at the distal end side of the connection piece 46A or 46C so as to extend around onto the back surface of the connection piece 46A or 46C. Further, a lateral tab 64 is formed on the distal end portion of each extension portion 53, at the lateral edge side of the connection piece 46A or 46C and at the position of the groove 49, so as to extend around onto the back surface of the connection piece 46A or 46C.

Meanwhile, the fusing terminal 51B at the center includes a fusing portion 65 at one end side that fuses the lead wire and an extension portion 66 that extends from the fusing portion 65 along the front surface of the connection piece 46B. A clamping piece 67 is formed at the outer side of the fusing portion 65 so as to be folded back from the rear end of the fusing portion 65 frontward, and the fusing portion 65 is supported in an upright attitude by a pair of holding portions 68, 68 that are formed on end portions of the partition ribs 45, 45 and at the inner peripheral side of the ring portion 39. A through hole 69 corresponding to the nut 47 is formed in the extension portion 66, and a lower tab 70 is formed on the extension portion 66 so as to extend around onto the back surface of the connection piece 46B.

Figure 6:
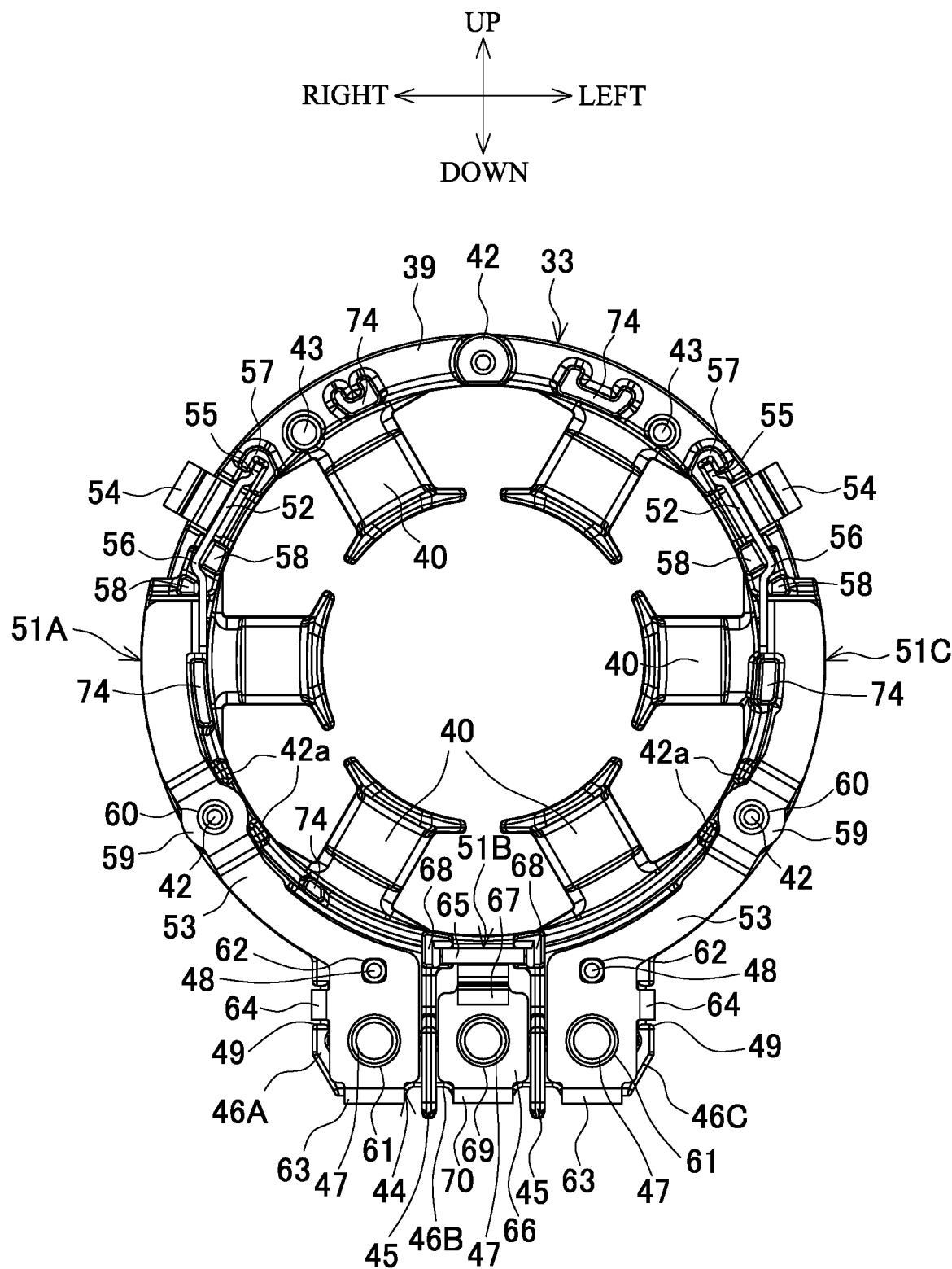
FIG. 6 is a front view of the front insulating member.

Thus, the right and left fusing terminals 51A and 51C are positioned at the front surface of the ring portion 39 by inserting the support pieces 55 and 56 of each fusing portion 52 between the holding projection 57 and the clamping projections 58 from the front of the ring portion 39, fitting the projection portion 59 of each extension portion 53 to the screw boss 42, and fitting each square hole 62 to the positioning projection 48. In this state, the lower tabs 63 and the lateral tabs 64 are brought into engagement with the back side of the connection pieces 46A and 46C. Accordingly, as shown in FIG. 6, the fusing terminals 51A and 51C are supported in a state where the fusing portions 52 are upright from the ring portion 39 and the extension portions 53 project downward from the lower portion of the ring portion 39. In this state, the through holes 60 are located so as to be coaxial with screw holes of the screw bosses 42, 42, and the through holes 61 are located so as to be coaxial with the nuts 47. Restricting projections 42a, 42a that restrict movement of the fusing terminals 51A and 51C to the inner side of the projection portions 59 are provided so as to project at the inner side of the two screw bosses 42 at the lower side (the inner peripheral side of the ring portion 39).

Meanwhile, regarding the fusing terminal 51B at the center, in a positioned state where both ends of the fusing portion 65 are inserted to the holding portions 68, 68 of the partition ribs 45, 45 such that the extension portion 66 is in contact with the front surface of the connection piece 46B, the lower tab 70 is brought into engagement with the back side of the connection piece 46B. Accordingly, the fusing terminal 51B is supported in a state where the fusing portion 65 is upright from the ring portion 39 and the extension portion 66 projects downward from the lower portion of the ring portion 39. In this state, the through hole 69 is located so as to be coaxial with the nut 47.

The rear insulating member 34 also includes a ring portion 71 and six insulating ribs 72, 72 . . . . The ring portion 71 has an outer diameter substantially equal to that of the stator core 32 and is made of a resin. The six insulating ribs 72, 72 . . . are formed at the inner peripheral side of the ring portion 71 so as to extend in the radial direction and are located in rear of the respective teeth 37 of the stator core 32. Fitting ribs 73, 73 . . . fitted to the respective slots 38 are formed on the front surface of the rear insulating member 34 over the inner edges of the insulating ribs 72, 72 adjacent to each other in the circumferential direction and over the inner edge of the ring portion 71 so as to project frontward.

The coils 35, 35 . . . are wound so as to be paired on a diagonal line for each of the U-phase, the V-phase, and the W-phase. Jumper wires L1, L1 . . . connecting between the adjacent phases are arranged at the front insulating member 33 side and held between the clamping pieces 54 and 67 at the outer side of the fusing portions 52 and 65 of the respective fusing terminals 51A to 51C. A cut 45a is formed in each of the partition ribs 45, 45 so as to allow the jumper wires L1 to be arranged to the fusing portion 65. On the ring portion 39, a plurality of front guide ribs 74, 74 . . . for guiding the arrangement of the jumper wires L1 are provided upright in the circumferential direction. In addition, jumper wires L2, L2 . . . connecting between the paired coils 35 of the respective phases are arranged at the rear insulating member 34 side. On the ring portion 71, rear guide ribs 75, 75 for guiding the arrangement of the jumper wires L2 are provided upright in the circumferential direction.

The lead wires through which power is supplied to the respective fusing terminals 51A to 51C are connected via a terminal unit 76. As shown in FIGS. 4, 7A, 7B, 8A, and 8B, the terminal unit 76 is formed by integrally molding, from a synthetic resin, three strip-shaped lead wire-side terminals 77A, 77B, and 77C corresponding to the respective fusing terminals 51A, 51B, and 51C in a state where the lead wire-side terminals 77A, 77B, and 77C are arranged in the right-left direction at predetermined intervals. Each of the lead wire-side terminals 77A to 77C includes a distal end portion 78 that extends upward and has a through hole 79 formed at an end thereof, an intermediate portion 80 that is bent rearward at a right angle from the distal end portion 78, and a proximal end portion 81 that is bent downward at a right angle from the intermediate portion 80. The intermediate portions 80 of the lead wire-side terminals 77A to 77C are formed so as to be integrated with each other by a resin portion 82. The resin portion 82 has a receiving piece 83 formed so as to be able to hold the connection plate 44, including the extension portions 53 and 66 of the fusing terminals 51A to 51C, between the distal end portion 78 and the receiving piece 83, and three lead wires 84, 84 . . . arranged from a three-phase bridge circuit of the control circuit board 10 are soldered (spot-welded) to the respective proximal end portions 81.

The sensor circuit board 36 includes a disc portion 85 that has an outer diameter smaller than the inner diameter of the ring portion 39 of the front insulating member 33 and has a through hole 86 formed at the center thereof. The sensor circuit board 36 also includes three screw fastening pieces 87, 87 . . . and two positioning pieces 89, 89. The three screw fastening pieces 87, 87 . . . have, at distal ends thereof, through holes 88 corresponding to the three screw bosses 42, and the two positioning pieces 89, 89 have, at distal ends thereof, through holes 90 corresponding to the two positioning pins 43. The three screw fastening pieces 87, 87 . . . and the two positioning pieces 89, 89 radially project from the outer periphery of the disc portion 85. A connecting piece 91 is provided between the two screw fastening pieces 87, 87 at the lower side so as to project downward and be located in front of the connection plate 44. A connection portion 93 for six signal wires 94, 94 . . . electrically connected to rotation detection elements 92, 92 . . . (FIG. 10B) provided on the back surface of the disc portion 85 is provided at an end portion of the connecting piece 91. In the connecting piece 91, a square escape hole 95 is formed between the through hole 86 and the connection portion 93, as an escape portion for avoiding interference between the holding portion 68 and the fusing portion 65 of the fusing terminal 51B. The connecting piece 91 is formed at an eccentric position such that the left side of the escape hole 95 at the center is wider. Thus, a circuit pattern extending on the connecting piece 91 to the connection portion 93 branches to both sides of the escape hole 95 such that two wires are arranged at the narrow right side and four wires are arranged at the wide left side.

Thus, regarding the stator 30, the front insulating member 33 and the rear insulating member 34 are assembled to the front and rear of the stator core 32 by fitting the fitting ribs 41 and 73 to the slots 38 such that the phases are matched, and the fusing terminals 51A to 51C are assembled to the front insulating member 33 in which the nuts 47 are buried in the connection pieces 46A to 46C, respectively. Next, the coils 35, 35 . . . of the three phases are wound on the respective teeth 37 such that the jumper wires L1 are extended so as to pass between the fusing portions 52 and 65 and the clamping pieces 54 and 67 of the front insulating member 33 and the jumper wires L2 are extended so as to pass at the outer side of the rear guide ribs 75 of the rear insulating member 34. The jumper wires L1 are fused at the fusing portions 52 and 65.

Figure 7:
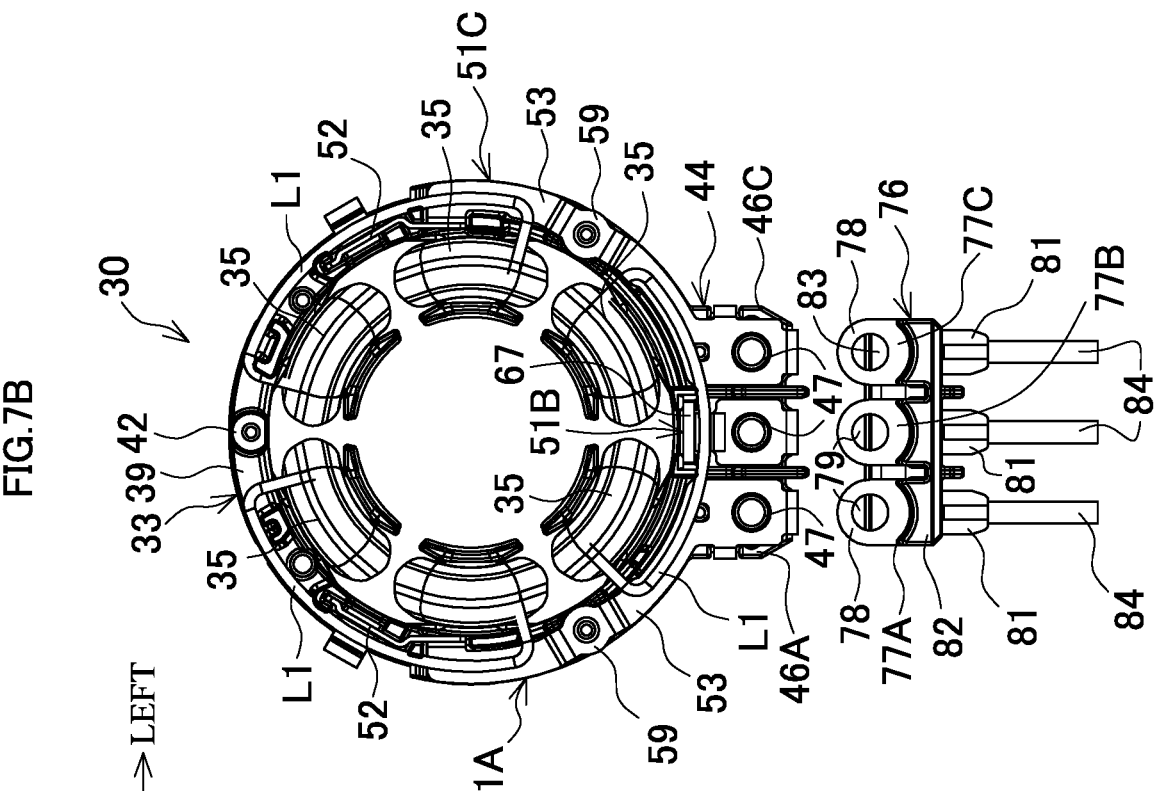
FIG. 7A is a front view of the stator from which a sensor circuit board is removed.
FIG. 7B is a front view of the stator from which a terminal unit is removed.
Figure 8:
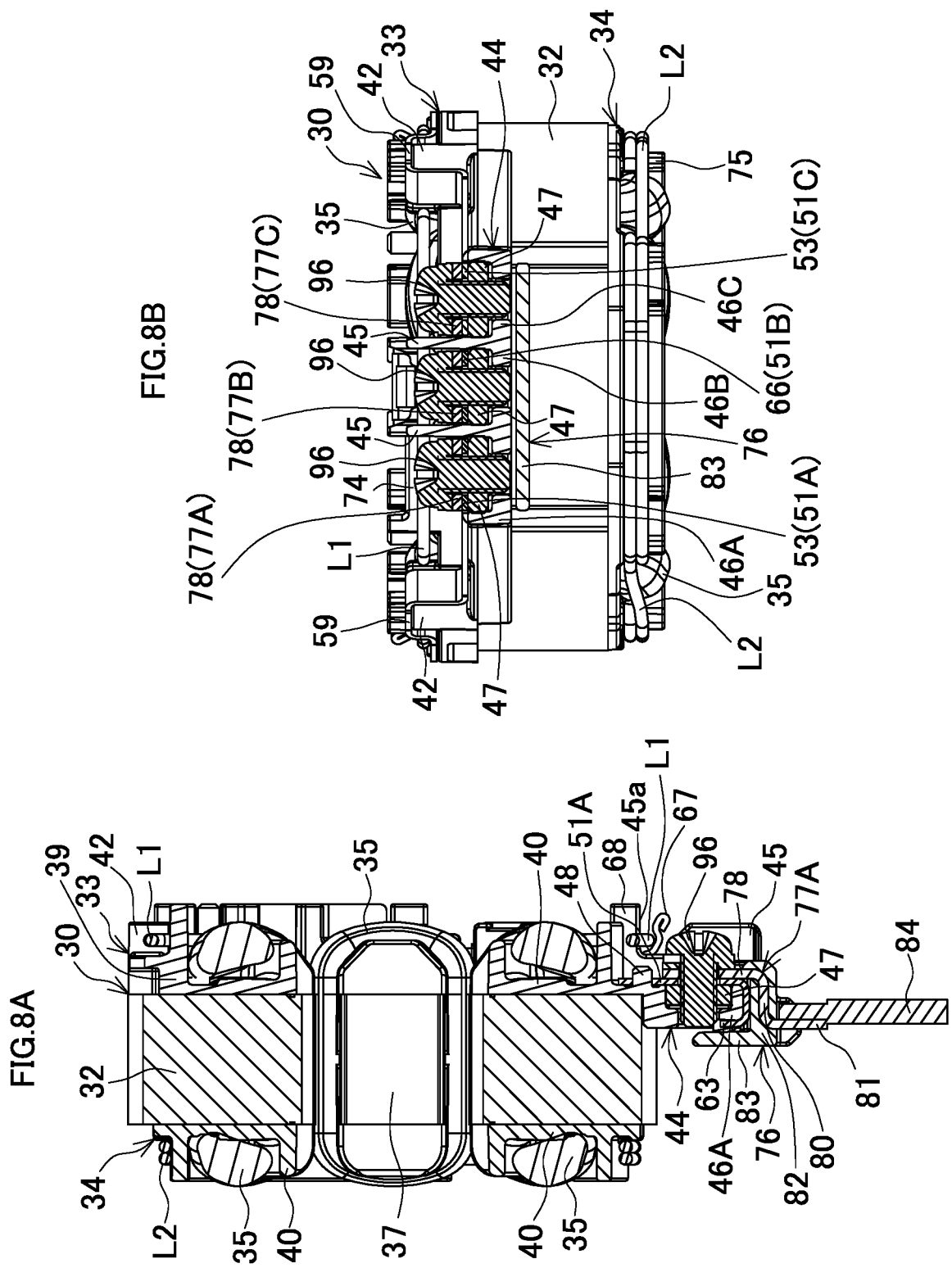
FIG. 8A is a cross-sectional view taken along a line A-A in FIG. 7A.
FIG. 8B is a cross-sectional view taken along a line B-B in FIG. 7A.

The terminal unit 76 in which the lead wires 84 are soldered (or spot-welded) is assembled from the outer side in the projecting direction of the connection plate 44 such that the connection plate 44 is sandwiched between the distal end portion 78 of the lead wire-side terminals 77A to 77C and the receiving piece 83, as shown in FIG. 7B. Accordingly, a provisionally fixed state is obtained in which the distal end portions 78 of the lead wire-side terminals 77A to 77C are located in front of the corresponding fusing terminals 51A to 51C with the partition ribs 45 interposed therebetween and each through hole 79 is located in front of the through holes 61 and 69. In this provisionally fixed state, when screws 96, 96 . . . are penetrated through the through holes 79 of the distal end portions 78 and the through holes 61 and 69 of the fusing terminals 51A to 51C and screwed into the nuts 47, the lead wire-side terminals 77A to 77C for the lead wires 84 are electrically connected to the corresponding fusing terminals 51A to 51C at the same time, and also electrically connected to the jumper wires L1 between the respective phases, as shown in FIGS. 7A, 8A, and 8B, thereby completing a delta connection.

Figure 9:
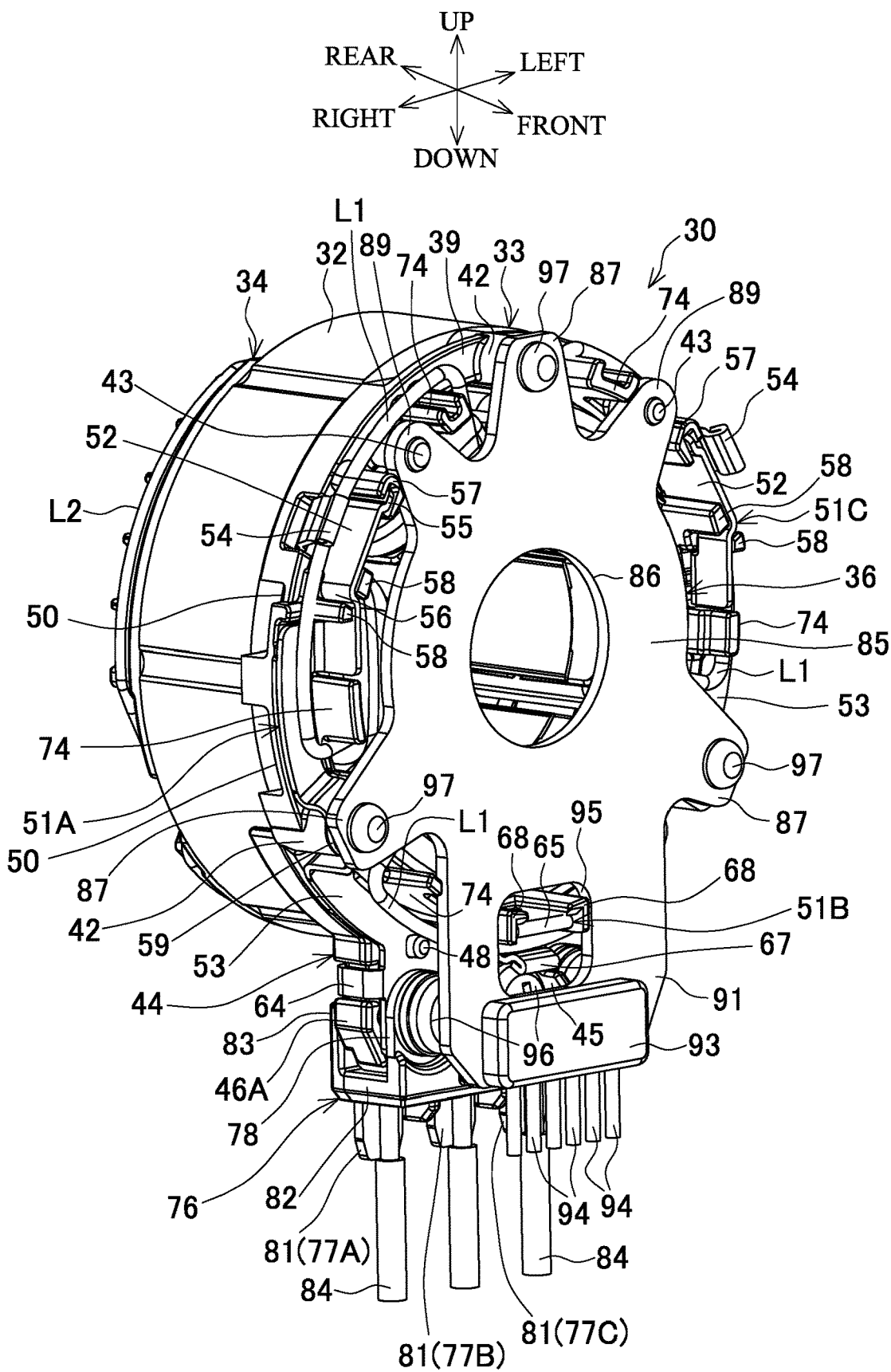
FIG. 9 is a perspective view of the stator.
Figure 13C:
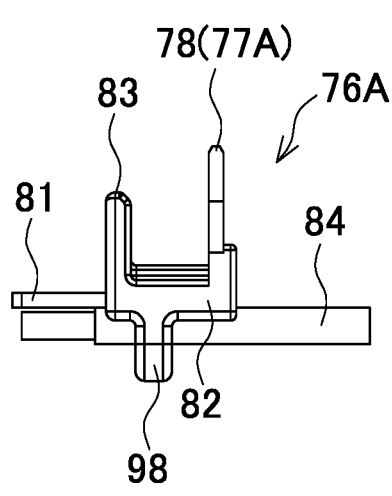
FIG. 13C is a side view of the terminal unit.
Figure 13A:
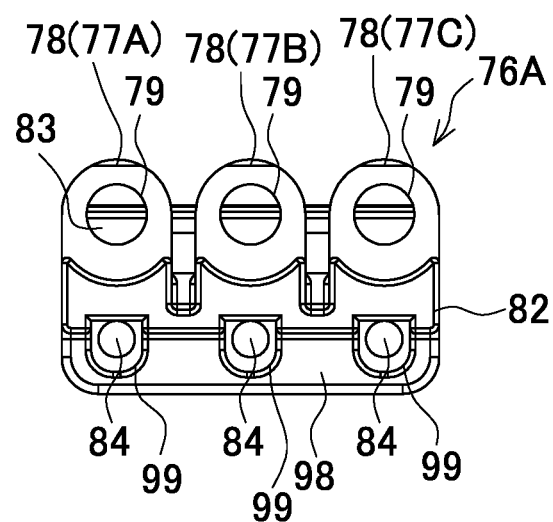
FIG. 13A is a front view of the terminal unit.
Figure 13B:
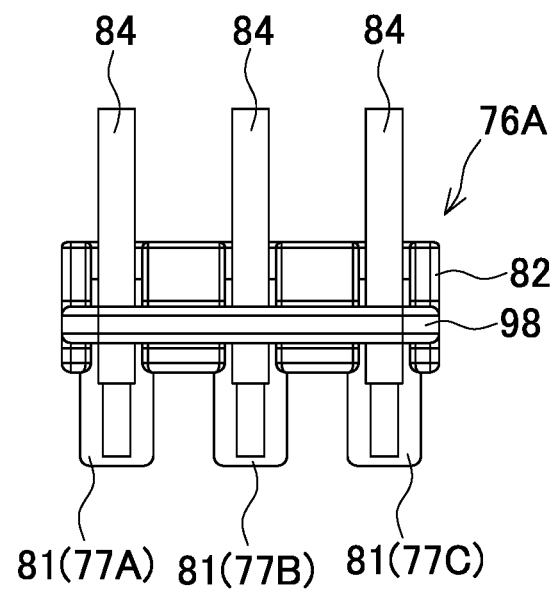
FIG. 13B is a bottom view of the terminal unit.

Finally, the sensor circuit board 36 is positioned by penetrating the positioning pins 43 through the through holes 90 of the positioning pieces 89, respectively, the through holes 88 of the screw fastening pieces 87 are set in front of the screw bosses 42 (through the projection portions 59 of the fusing terminals 51A and 51C at the two screw bosses 42 at the lower side) and fixed by means of screws 97, 97 . . . . Accordingly, the stator 30 is obtained in which the sensor circuit board 36 is screw-fastened at the front side of the terminal unit 76 as shown in FIGS. 9 and 10A. In this state, the fusing terminals 51A and 51C are fixed together with the sensor circuit board 36 by means of the screws 97 such that the projection portions 59 are held between the screw fastening pieces 87 and the screw bosses 42 as shown in FIG. 10B.

As shown in FIG. 3, the rotor 31 includes the rotation shaft 100 that is located at the axis thereof, a tubular rotor core 101 that is disposed around the rotation shaft 100, a tubular permanent magnet 102 that is disposed at the outer side of the rotor core 101 and has different polarities alternated in the circumferential direction, and a plurality of sensor permanent magnets 103 that are radially arranged in front of these components. A pinion 104 is mounted at the front end of the rotation shaft 100, and a bearing 105 is assembled in rear of the pinion 104. A centrifugal fan 106 is mounted at the rear end of the rotation shaft 100, and a bearing 107 is assembled in rear of the centrifugal fan 106. The bearing 107 is retained by a rear cover 24 that is spigot-connected to a rear portion of the motor housing 22.

Meanwhile, the front end of the rotation shaft 100 projects frontward through a bearing retainer 108 that is held by the motor housing 22 in front of the brushless motor 13, and the bearing 105 is retained by the bearing retainer 108.

The bearing retainer 108 is made of metal, has a disc shape, and is held by the motor housing 22 in a state where movement thereof in the front-rear direction is restricted, by bringing engagement ribs 109, which are provided on the inner surface of the motor housing 22, into engagement with a constriction portion formed at the center of the bearing retainer 108. A ring wall 110 is provided at the periphery of the front surface of the bearing retainer 108 so as to project frontward, and has a male screw portion on the outer periphery thereof. The rear end of the hammer case 14 is screwed to the ring wall 110, so that a rear portion of the hammer case 14 is closed. The hammer case 14 is a metallic tubular body having a tapered front half, and a front tube portion 111 is formed at the front end of the hammer case 14 and is brought into engagement with the inner surface of the motor housing 22, so that rotation of the hammer case 14 is prevented.

The rear end of the spindle 16 is supported at a front portion of the bearing retainer 108 via a bearing 112. The spindle 16 has a hollow disc-shaped carrier portion 113 at a rear portion thereof, and the pinion 104 of the rotation shaft 100 projects into a bottomed hole 114 formed from the rear at the axis.

The planetary gear speed reducing mechanism 15 includes an internal gear 115 having internal teeth, and three planetary gears 116, 116 . . . that are in mesh with the internal gear 115 and have external teeth. The internal gear 115 includes a large-diameter portion 117 at the outer peripheral side of a front portion thereof, and the large-diameter portion 117 is brought into engagement with the inner peripheral surface of the hammer case 14, so that rotation of the internal gear 115 is prevented and axial movement of the internal gear 115 is restricted between the ring wall 110 and a step portion 118 provided on the inner periphery of the hammer case 14. Reference numeral 119 denotes an O-ring provided at the inner side of the ring wall 110 and interposed between the rear end of the internal gear 115 and an the front surface of the bearing retainer 108. The O-ring 119 seals between the internal gear 115 and the bearing retainer 108 and also alleviates a shock from the internal gear 115 to the bearing retainer 108.

The planetary gears 116 are rotatably supported by pins 120 within the carrier portion 113 and mesh with the pinion 104 of the rotation shaft 100.

The hammering mechanism 17 includes a hammer 121 provided externally on the spindle 16 and a coil spring 122 that biases the hammer 121 frontward. First, the hammer 121 has a pair of tabs (not shown) at the front surface thereof, and is connected to the spindle 16 via balls 123, 123 that are fitted on an outer cam groove formed on the inner surface of the hammer 121 and on an inner cam groove formed on the surface of the spindle 16. In addition, a ring-shaped groove 124 is formed on the rear surface of the hammer 121, and the front end of the coil spring 122 is inserted into the groove 124. The rear end of the coil spring 122 is in contact with the front surface of the carrier portion 113.

The anvil 18 is supported by a bearing 125 that is retained by the front tube portion 111 of the hammer case 14, and a pair of arms 126, 126 are formed at the rear end of the anvil 18 and are engaged with the tabs of the hammer 121 in a rotational direction. A ring-shaped projection 127 is provided so as to project at the inner peripheral side of the rear surface of the front tube portion 111 and in front of the arms 126, and a resin washer 128 for receiving the arms 126 are fitted at the outer side of the projection 127.

A fitting hole 129 is formed in the rear surface of the anvil 18 and at the axis, and the front end of the spindle 16 is coaxially inserted into the fitting hole 129. In the spindle 16, first communication holes 130, 130 are formed so as to extend in the radial direction and cause the bottomed hole 114 to communicate with the inner peripheral surface of the hammer 121, and a second communication hole 131 is formed at the axis so as to cause the bottomed hole 114 to communicate with the fitting hole 129, so that grease within the bottomed hole 114 can be supplied to the inner peripheral surface of the hammer 121 and into the fitting hole 129.

In the impact driver 1 configured as described above, the stator 30 of the brushless motor 13 is assembled into the motor housing 22 together with the rotor 31 by receiving ribs 132, 132 (FIGS. 2 and 3) and engagement projections (not shown) so as to be coaxial with the main body 2 in such an attitude that the connection plate 44 is located at the lower side. The receiving ribs 132, 132 are provided so as to project on the inner surface of the motor housing 22 and extend in the circumferential direction, and the engagement projections are brought into engagement with the recesses 50 of the front insulating member 33. Thus, the lead wires 84 connected to the connection plate 44 via the terminal unit 76 are arranged downward in rear of the switch 6, pass within the grip portion 3, and are connected to the control circuit board 10. Here, the lead wires 84 and the sensor circuit board 36 are screw-fastened, and thus a screw-fastening operation is enabled to be performed in assembling into the motor housing 22. Accordingly, if the coils 35 are only fused in advance, it is unnecessary to perform an operation such as soldering the lead wires in advance.

Switching elements for switching energization of the coils 35 are mounted on the control circuit board 10, and the signal wires 94 connected to the connection portion 93 of the sensor circuit board 36 from the control circuit board 10 in the downward direction are also extended from the connection portion 93 through rear of the switch 6 within the grip portion 3.

In the impact driver 1, when the trigger 7 is pressed to make the switch 6 ON, power is supplied to the brushless motor 13 through the lead wires 84, and the rotation shaft 100 rotates. That is, the control circuit board 10 of the controller 9 acquires a rotation state of the rotor 31 by acquiring rotation detection signals that are outputted from the rotation detection elements 92 of the sensor circuit board 36 and indicate the positions of the sensor permanent magnets 103 of the rotor 31, controls ON/OFF of each switching element in accordance with the acquired rotation state, and rotates the rotor 31 together with the rotation shaft 100 by applying a current to the respective coils 35 of the stator 30 in order.

Accordingly, the planetary gears 116, which mesh with the pinion 104, make orbital motion within the internal gear 115 to rotate the spindle 16 at a reduced speed via the carrier portion 113. Thus, the hammer 121 also rotates to rotate the anvil 18 via the arms 126 with which the tabs of the hammer 121 are engaged, thereby enabling screw-fastening by the bit. When the screw-fastening advances so that the torque of the anvil 18 increases, the hammer 121 retracts against the biasing of the coil spring 122 while causing the balls 123 to roll along the inner cam groove of the spindle 16. When the tabs are separated from the arms 126, the hammer 121 rotates while advancing, by the biasing of the coil spring 122 and guide of the inner cam groove, to bring the tabs into engagement with the arms 126 again, thereby generating a rotation hammering force (impact) in the anvil 18. By repeating this, further fastening is enabled.

Then, when the centrifugal fan 106 rotates with rotation of the rotation shaft 100, air taken in through the suction ports 26 at the front side passes through the brushless motor 13 to cool the brushless motor 13, and then is discharged through the exhaust ports 25 at the rear side. When passing through the brushless motor 13, the air entering through the suction ports 26 flows through the outer side of the disc portion 85 of the sensor circuit board 36 and the through hole 86 at the inner side of the disc portion 85 into the stator 30. Then, the air flows through between the stator 30 and the rotor 31 and the slots 38 between the coils 35, 35 to the centrifugal fan 106, so that the coils 35 can also be cooled.

As described above, the impact driver 1 of the above-described embodiment adopts an invention in which the fusing terminals 51A to 51C that are coil-side terminals and the lead wire-side terminals 77A to 77C are connected to each other at a predetermined position (the connection plate 44) in the circumferential direction of the stator 30 by means of the screws 96.

Thus, an end processed portion is only one location on the stator 30, so that the size of the stator 30 does not increase in the radial direction, and wiring can be achieved collectively at the one location by using a dead space. Accordingly, the brushless motor 13 can be accommodated in a reduced space, and the motor housing 22 can be kept compact. In addition, an end processing operation can be performed collectively at the connection plate 44 of the stator 30, so that the productivity and the handleability also improve. In particular, since the terminal unit 76 is fixed by screw-fastening, a screw-fastening operation for the terminal unit 76 only needs to be performed in assembling into the motor housing 22, and it is not necessary to screw-fasten the terminal unit 76 during production of the stator 30. Thus, the lead wires 84 do not become obstacles, and in repairing or the like, the brushless motor 13 can be easily separated from the controller 9 side if the terminal unit 76 is removed.

In addition, here, the lead wire-side terminals 77A to 77C are enabled to be provisionally fixed to the fusing terminals 51A to 51C at the connection position by means of the screws 96, by the terminal unit 76. Thus, an operation of positioning of the lead wire-side terminals 77A to 77C and a screw fastening operation can be easily performed.

In an invention regarding screw-fastening of terminals, a terminal unit for putting lead wires together is not essential, and each lead wire may be positioned to a fusing terminal and screw-fastened as long as the lead wires can be screw-fastened at a predetermined position on the stator. Further, the screw-fastening position is not limited to the lower portion of the stator, and may be an upper portion or a side portion of the stator.

The impact driver 1 of the above-described embodiment also adopts an invention in which the fusing terminals 51A and 51C are extended along the circumferential direction of the stator 30 and connected to the lead wire-side terminals 77A to 77C at a predetermined position (the connection plate 44) in the circumferential direction of the stator 30.

Thus, although the fusing portions 52 are away from each other in the circumferential direction, an end processed portion is only one location on the stator 30, the size of the stator 30 does not increase in the radial direction, and wiring can be achieved collectively at the one location by using a dead space. Accordingly, the brushless motor 13 can be accommodated in a reduced space, and the motor housing 22 can be kept compact. In addition, an end processing operation can be performed collectively at the connection plate 44 of the stator 30, so that the productivity and the handleability also improve.

In particular, here, the sensor circuit board 36 for detecting the rotation position of the rotor 31 is screw-fastened to the end portion of the stator 30, and the fusing terminals 51A and 51C are fixed together with the sensor circuit board 36 by means of the screws 97 for fixing the sensor circuit board 36. Thus, a reasonable configuration is provided in which the fusing terminals 51A and 51C are fixed with screw-fastening of the sensor circuit board 36, leading to simplification of an assembling operation and shortening of an operation time.

In addition, since the escape hole 95 for avoiding interference with the fusing terminal 51B is provided in the sensor circuit board 36, the sensor circuit board 36 can be mounted at the installation side of the fusing terminals 51A to 51C without interference, and the axial dimension can be reduced.

In an invention in which a fusing terminal is extended, the two fusing terminals at the right and left sides other than the center are extended in the above-described embodiment, but the left and central fusing terminals or the right and central fusing terminals may be extended, or all the fusing terminals may be extended, depending on the connection position.

The impact driver 1 of the above-described embodiment adopts an invention in which the plurality of lead wires 84, 84 . . . are unitized into the terminal unit 76 and connected to the plurality of coils 35, 35 . . . at a predetermined position (the connection plate 44) in the circumferential direction of the stator 30.

Thus, an end processed portion is only one location on the stator 30, so that the size of the stator 30 does not increase in the radial direction, and wiring can be achieved collectively at the one location by using a dead space. Accordingly, the brushless motor 13 can be accommodated in a reduced space, and the motor housing 22 can be kept compact. In addition, an end processing operation can be performed collectively at the connection plate 44 of the stator 30, so that the productivity and the handleability also improve. In particular, electrical connection of the plurality of lead wires 84 can be made at one time by the terminal unit 76, so that a time required for end processing is further shortened and an operation for end processing is made further efficient.

In an invention regarding a terminal unit, in the above-described embodiment, the power lines connected to the stator are extended in the radial direction, but the direction in which the power lines are extended can be changed in accordance with a change in the shape of the terminal unit. FIG. 11 is an illustrative diagram of a driver drill 140 showing a modification of the terminal unit. Components that are the same as those of the impact driver 1 described above are designated by the same reference numerals, and the overlapping description thereof is omitted.

In the main body 2, a gear assembly 141 including speed reducing and speed changing mechanisms, a clutch mechanism, etc. is provided in front of the brushless motor 13, and a mode switching ring 142 for switching between a driver mode and a drill mode and a torque adjusting ring 143 for performing torque adjustment in the driver mode are provided in front of the gear assembly 141. A drill chuck 144 is provided at a distal end of a spindle that projects frontward from the gear assembly 141 and is not shown.

The stator 30 and the rotor 31 of the brushless motor 13 have the same structure as described in the above embodiment. However, in a terminal unit 76A used here, the lead wire-side terminals 77A to 77C are each formed in an L shape in which the proximal end portion 81 is not bent from the intermediate portion 80, and the proximal end portion 81 projects rearward along an extension of the intermediate portion 80, as shown in FIGS. 12A to 13C. In addition, a protection plate 98 is integrally formed on the lower surface of the resin portion 82 so as to be orthogonal to the intermediate portion 80 and extend downward. Through holes 99, 99 . . . corresponding to the lead wire-side terminals 77A to 77C are formed in the protection plate 98.

Each lead wire 84 is penetrated through the through hole 99 from the front of the protection plate 98 and is soldered (or spot-welded) to the lower surface of the proximal end portion 81 in rear of the through hole 99, and thus the lead wire 84 is extended frontward from the terminal unit 76A.

Figure 14:
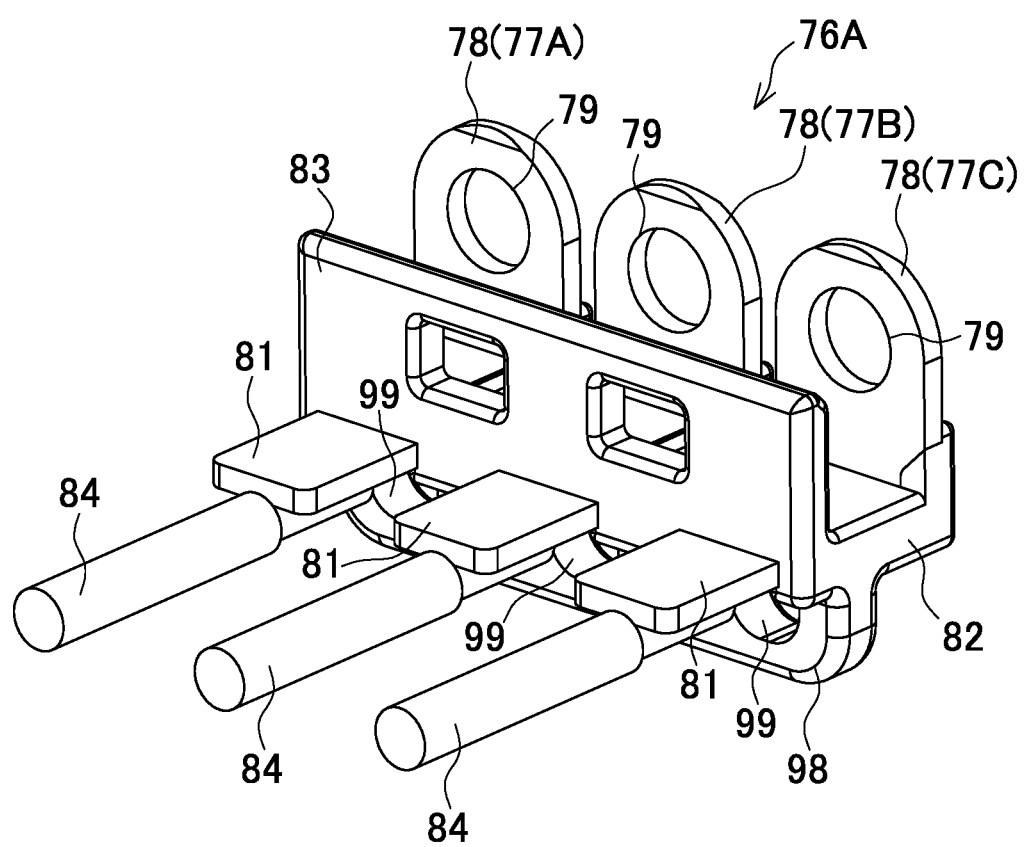
FIG. 14 is a perspective view of a terminal unit in which a direction in which lead wires are extended is reversed.
Figure 15C:
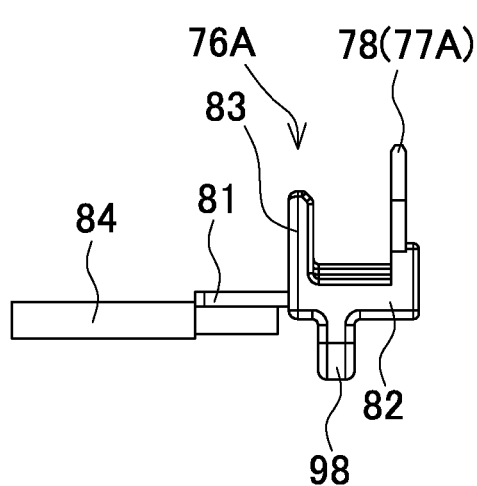
FIG. 15C is a side view of the terminal unit.
Figure 15A:
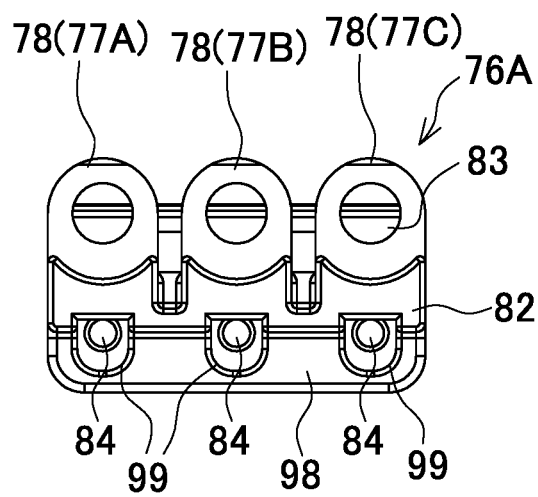
FIG. 15A is a front view of the terminal unit.
Figure 15B:
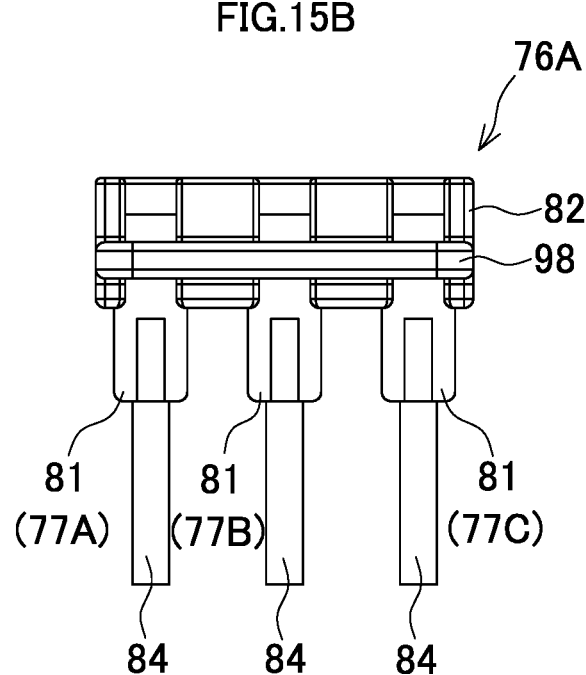
FIG. 15B is a bottom view of the terminal unit.

On the other hand, in the case where each lead wire 84 is extended rearward from the terminal unit 76A, each lead wire 84 only needs to be soldered (or spot-welded) directly to the lower surface (may be the upper surface) of the proximal end portion 81 without being penetrated through the protection plate 98, as shown in FIGS. 14 to 15C.

In the driver drill 140 of the modification as well, an end processed portion is only one location on the stator 30, so that the size of the stator 30 does not increase in the radial direction, and wiring can be achieved collectively at the one location by using a dead space. Accordingly, the brushless motor 13 can be accommodated in a reduced space, and the motor housing 22 can be kept compact. In addition, an end processing operation can be performed collectively at the connection plate 44 of the stator 30, so that the productivity and the handleability also improve. In particular, electrical connection of the plurality of lead wires 84 can be made at one time by the terminal unit 76A, so that a time required for end processing is further shortened and an operation for end processing is made further efficient. Furthermore, since the frontward direction or the rearward direction can be selected as the direction in which the lead wires 84 are extended, the extended direction can be changed according to a space within the housing or an internal wiring state, so that versatility is also ensured.

In the above-described modification or embodiment, the connection structure for the terminal unit and the connection plate is not limited to the structure in which the substantially U-shaped terminal unit is fitted externally to the connection plate. The connection structure may be a structure in which, reversely, a substantially U-shaped connection plate is fitted externally to a terminal unit, or may be a structure in which one of a terminal unit and a connection plate is formed as a tubular connector and the other thereof is inserted into the connector. Thus, the invention regarding the terminal unit is not limited to screw-fixing. In addition, electrical connection can be achieved by forming one of a coil-side terminal and a lead wire-side terminal in a female-type shape, forming the other in a male-type shape, and insertion or holding either the coil-side terminal or the lead wire-side terminal.

From the above description, it is possible to grasp an invention regarding an electric power tool set described below.

The electric power tool set includes a first electric power tool (impact driver 1) and a second electric power tool (driver drill 140).

The first electric power tool includes a first brushless motor 13 including a first stator 30 in which first coils 35 are wound and that includes first coil-side terminals (fusing terminals 51A to 51C) to which the first coils 35 are connected and a first rotor 31 capable of rotating relative to the first stator 30, first lead wires 84 for supplying power to the first coils 35, and first lead wire-side terminals 77A to 77C to which the first lead wires 84 are connected. The first coil-side terminals (fusing terminals 51A to 51C) and the first lead wire-side terminals 77A to 77C are connected to each other at a predetermined position in a circumferential direction of the first stator 30 by means of screws 96.

The second electric power tool (driver drill 140) includes a second brushless motor 13 including second stators 30 in which second coils 35 are wound and that includes second coil-side terminals (fusing terminals 51A to 51C) to which the second coils 35 are connected and a second rotor 31 capable of rotating relative to the second stator 30, second lead wires 84 for supplying power to the second coils 35, and second lead wire-side terminals 77A to 77C to which the second lead wires 84 are connected. The second coil-side terminals (fusing terminals 51A to 51C) and the second lead wire-side terminals 77A to 77C are connected to each other at a predetermined position in a circumferential direction of the second stator 30 by means of screws 96.

In the electric power tool set, a direction in which the lead wires 84 at the impact driver 1 side are extended and a direction in which the lead wires 84 at the driver drill 140 side are different from each other.

According to this invention, since the stator 30 of the brushless motor 13 and the lead wires 84 can be easily connected to or disconnected from each other by using the screws 96 in each electric power tool, the brushless motor 13 can be shared by electric power tools having different directions in which the lead wires 84 within the housing are extended. Therefore, it is unnecessary to produce a unit of a brushless motor and lead wires connected to the stator, by changing the extended direction of the lead wires for each electric power tool, leading to cost reduction.

In addition, in each invention, the sensor circuit board may be provided such that the front and the rear thereof are reversed, and connection with the lead wires may be made at the rear or lateral side of the stator. As a matter of course, the electric power tool is not limited to the impact driver or the driver drill, and each invention is applicable to other tools such as a hammer drill and a grinder. The same applies to the invention regarding the electric power tool set, and the number of the types of the electric power tools may be three or more.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool comprising:
 a stator including (i) a stator core having six teeth, (ii) a plurality of insulating members held by the stator core, (iii) six coils wound via the six teeth, and (iv) three fusing terminals to which the six coils are connected at three points;
 a rotor configured to rotate relative to the stator;
 three lead wires configured to supply power to the three fusing terminals; and
 a sensor circuit board configured to detect a rotation position of the rotor, the sensor circuit board being screw-fastened to an end portion of the stator, and the three fusing terminals are fixed to the sensor circuit board by a screw for fixing the sensor circuit board, wherein:
 at least one of the three fusing terminals includes a coil connection portion and a lead wire connection portion, the coil connection portion being disposed between two adjacent teeth of the six teeth, and the lead wire connection portion being disposed at a position that is offset from the coil connection portion in a circumferential direction of the plurality of insulating members.

2. The electric power tool according to claim 1, wherein the lead wire connection portion is enabled to be provisionally fixed to the coil connection portion at a connection position by the screw.

3. The electric power tool according to claim 1, wherein the stator includes a connection plate formed in at least one insulating member of the plurality of insulating members.

4. The electric power tool according to claim 3, wherein a plurality of the lead wire connection portions are integrally molded from a synthetic resin to form a terminal unit, and each lead wire connection portion of the plurality of lead wire connection portions is screw-fastened to the coil connection portion in a state where the terminal unit is assembled to the connection plate.

5. The electric power tool according to claim 4, wherein the terminal unit is assembled in a state of sandwiching the connection plate.

6. The electric power tool according to claim 5, wherein the lead wire connection portion has a strip shape in which a through hole for screw-fastening to the connection plate is formed in a distal end portion of the lead wire connection portion, and the lead wires are connected to a proximal end portion of the lead wire connection portion.

7. The electric power tool according to claim 1, wherein the stator includes a plurality of the coil connection portions to which the coils are connected, respectively, and a terminal unit connects the plurality of the coil connection portions to a plurality of the lead wire connection portions in a state of being mounted on the stator.

8. The electric power tool according to claim 1, wherein the coil connection portion is connected to a jumper wire connecting between adjacent coils of the six coils.

9. The electric power tool according to claim 1, wherein the at least one of the three fusing terminals extends across two teeth in the circumferential direction.

10. An electric power tool comprising:
a stator including (i) a stator core having six teeth, (ii) a plurality of insulating members held by the stator core, (iii) six coils wound via the six teeth, and (iv) three fusing terminals to which the six coils are connected at three points;
a rotor configured to rotate relative to the stator;
three lead wires configured to supply power to the three fusing terminals;
a sensor circuit board configured to detect a rotation position of the rotor, the sensor circuit board being screw-fastened to an end portion of the stator, and the three fusing terminals are fixed to the sensor circuit board by a screw for fixing the sensor circuit board; and
an escape portion configured to avoid interference with the three fusing terminals formed in the sensor circuit board, wherein:
at least one of the three fusing terminals includes a coil connection portion and a lead wire connection portion, the coil connection portion being disposed between two adjacent teeth of the six teeth, and the lead wire connection portion being disposed at a position that is offset from the coil connection portion in a circumferential direction of the plurality of insulating members.

* * * * *